Figure 1:
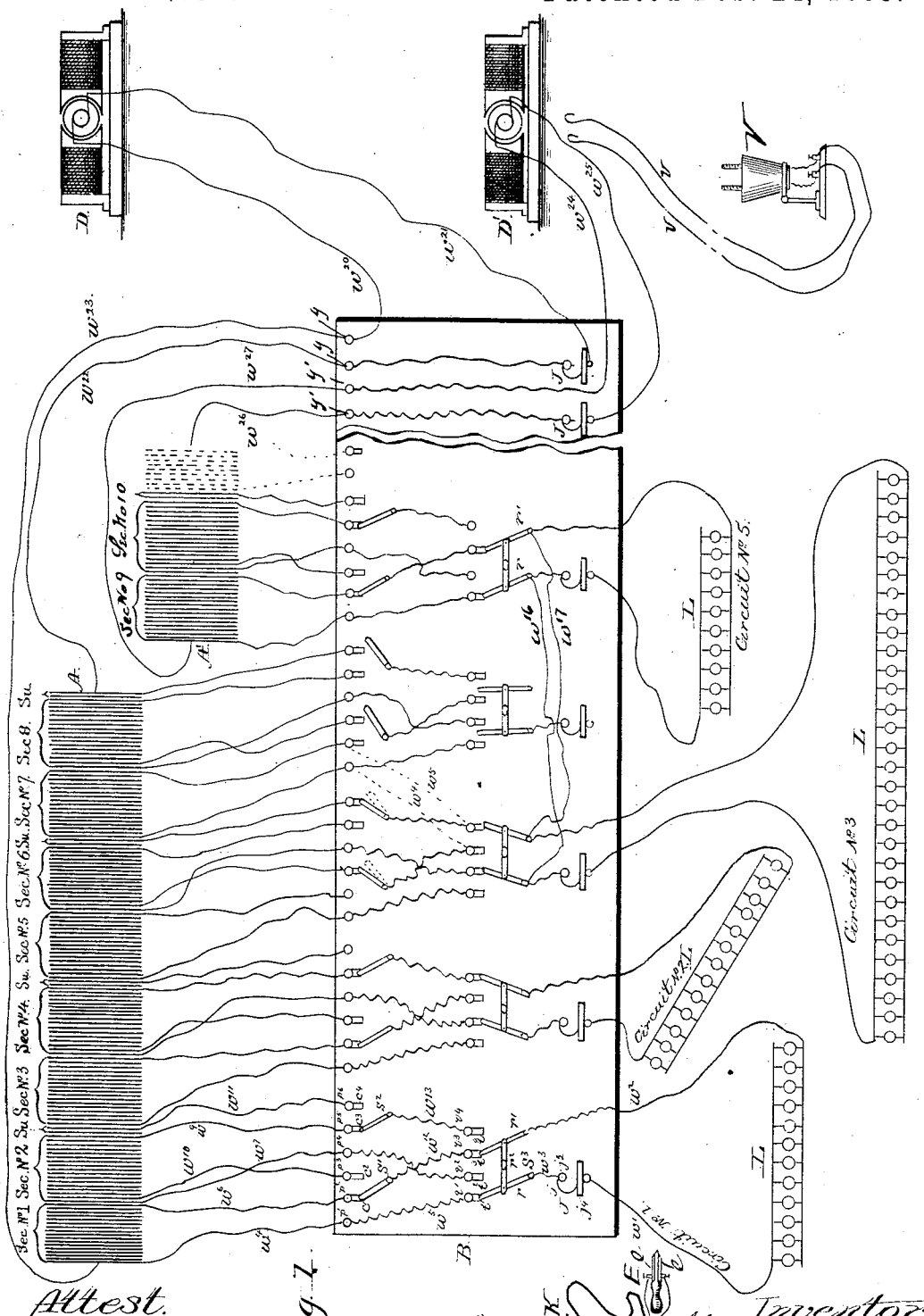

(No Model.) 2 Sheets—Sheet 1.

A. H. BAUER.
SYSTEM OF ELECTRIC LIGHTING BY SECONDARY BATTERIES.

No. 312,698. Patented Feb. 24, 1885.

Attest.
J. W. Reynolds
Edward E. Ellis

Inventor:
Alex. H. Bauer
per O. E. Duffy
Atty.

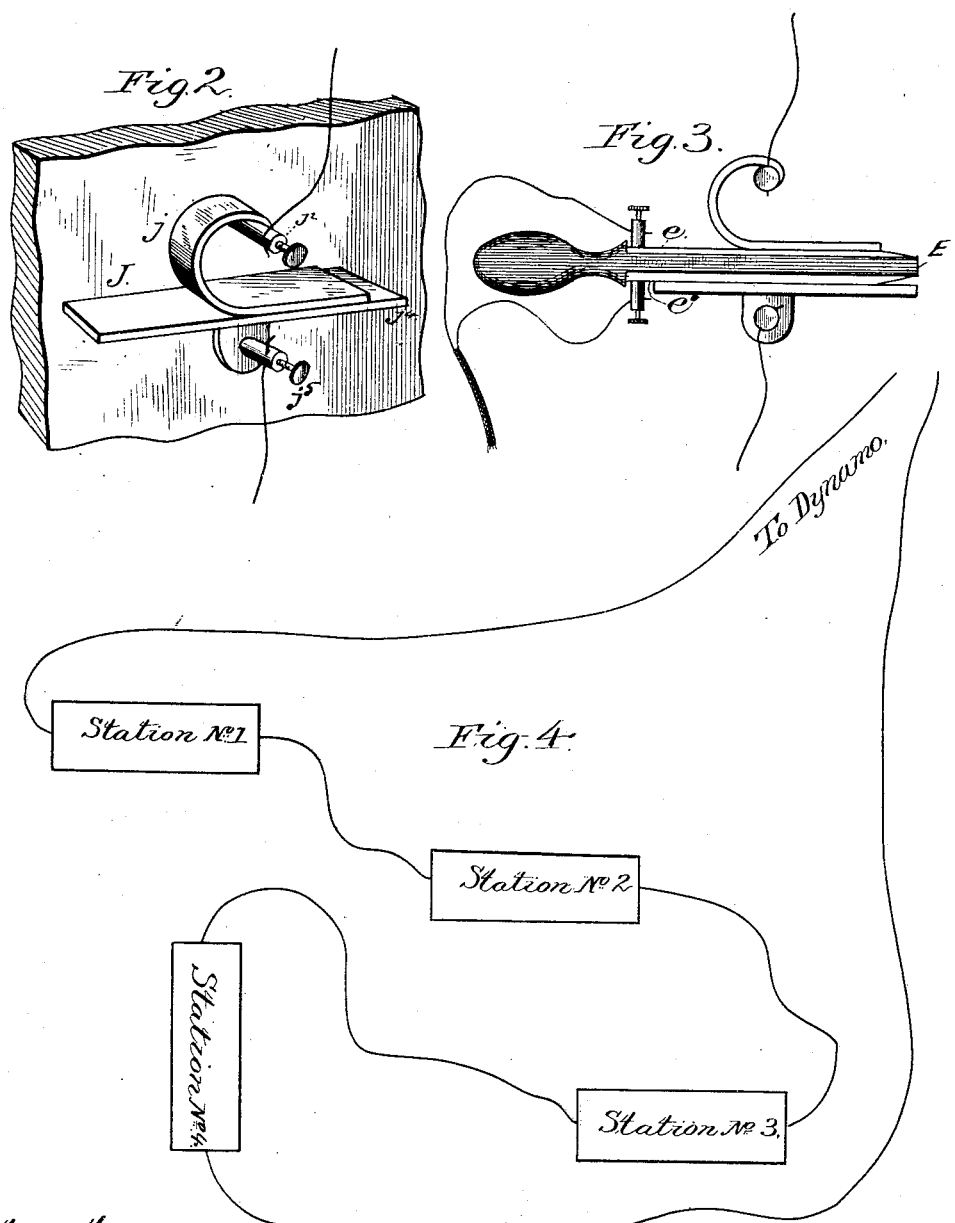

UNITED STATES PATENT OFFICE.

ALEXANDER H. BAUER, OF BALTIMORE, MARYLAND, ASSIGNOR TO THE VIADUCT MANUFACTURING COMPANY OF BALTIMORE, OF SAME PLACE.

SYSTEM OF ELECTRIC LIGHTING BY SECONDARY BATTERIES.

SPECIFICATION forming part of Letters Patent No. 312,693, dated February 24, 1885.

Application filed February 27, 1884. (No model.)

*To all whom it may concern:*

Be it known that I, ALEXANDER H. BAUER, of Baltimore, in the county of Baltimore and State of Maryland, have invented certain new and useful Improvements in Systems of Electric Lighting by Secondary Batteries or Accumulators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a system of electric lighting by means of secondary or accumulating electric batteries. In electric lighting by means of secondary batteries or accumulators as heretofore practiced the secondary or accumulating cells have been charged at a place where is located the dynamo-electric machinery, and then delivered in proper number to consumers, to be used and cared for on their premises, and in some cases the secondary-battery cells have been permanently located on the consumers' premises and there charged by means of circuit-wires connected with a dynamo-electric machine at a distant station. In the old system first mentioned there is a great expenditure of time and labor in transporting the discharged cells to the dynamo-station for recharging and back again to the consumers after being charged, and as accumulating like all other batteries are liable to get out of order, run down, and require testing cell by cell, there are in both of the old systems occasions when the consumers must suffer temporary deprivation of light, and apply to the station for a skilled person to inspect their batteries and put them in effective condition. Further disadvantages result from the fact that on consumers' premises the secondary cells are usually stowed away in cellars or other places not easily accessible for inspection, and are liable to be tampered with and injured by unauthorized persons.

It is the object of my invention to obviate the enumerated disadvantages of the old systems, and distribute the accumulator-currents from one or more central stations, where all the batteries are kept under the constant immediate supervision of persons skilled in their management, and where the cells may be charged, connected in consumers' circuits, tested, interchanged, and kept in order, and from whence proper currents may be maintained on all circuits without trouble to consumers and at a minimum expense to the suppliers.

The invention consists in certain combinations of devices or elements composing an electric-lighting system by means of secondary batteries or accumulators in which a number of consumers' batteries are located at a common station, and adapted for connection there in charging and to consumers' circuits, as required.

The invention will be fully understood from the particular description, in connection with the accompanying drawings, in which—

Figure 1 is a diagram illustrating a secondary battery or accumulator electric-lighting system according to my invention. Fig. 2 is a detached perspective view of one of the switches or spring-jacks by means of which an ammeter or other testing-instrument may be placed in any of the circuits. Fig. 3 is a detached view in elevation of one of the spring-jacks and a connecting-wedge inserted therein. Fig. 4 is a diagram illustrating the mode of connecting a number of accumulator-stations for charging.

Referring to Fig. 1, the letter A designates a series of secondary or accumulating battery-cells located at a central station, the individual cells being indicated by the parallel short lines and supposed to be connected in series in the ordinary manner. From the opposite ends of the whole series wires $w^{22}$ and $w^{23}$ lead through suitable connections to and are connected with a dynamo-electric machine, D, as customary for using the current from the machine for charging the cells. The dynamo may be located either at the station or at a distant point where power to operate it is convenient. The extent of the series is limited only by considerations of convenience. A second series, A', of secondary cells may be located at the same station, for reasons which will be hereinafter explained.

The cells in a series are allotted by sections to consumers, the sections being designated in the drawings by numbers, as "Section No. 1," and so on.

The number of cells in each section is determined by the kind of lamp used, or rather by the electro-motive force required to overcome the resistance of the kind of lamps on the circuit in which the cells are to be used. For instance, a Bernstein lamp requires seventeen cells, an Edison "B" lamp twenty-eight cells, an Edison "A" lamp fifty-five cells, a Weston lamp thirty-five cells, and so on.

The consumers' circuits in the diagram are designated by name and numbers, as "Circuit No. 1," "Circuit No. 2," and so on. The usual practice is to assign to each consumer's circuit two sections and two supernumerary cells, for reasons which will presently appear; but I do not confine myself to this practice.

Referring now to the diagram Fig. 1, the letter B designates a switch-board provided with devices for connecting the sections of secondary cells to the various consumers' circuits and charging-circuits, and for making the various changes which are at times required to meet the exigencies of the system. The switch-board devices for use with consumers' circuits are arranged in groups, and as these groups are precisely alike in the drawings, a description of one will suffice for all, though the various modes of using the devices are illustrated in separate groups, and will be separately explained.

I will now describe the group of devices assigned to circuit No. 1 and also the necessary connections. At the upper left-hand corner of the switch-board B are six metallic binding-posts, (marked $p'\ p^2\ p^3\ p^4\ p^5\ p^6$.) The posts $p^2$ and $p^3$ are respectively set upon two metallic plates, $c'$ and $s^3$, which form contact-plates for a switch, S', of common form, pivoted below. The posts $p^5$ and $p^6$ are similarly set upon contact-plates $c^3$ and $c^4$ of a switch, $S^2$. Below the switches S' and $S^2$ is a row of four binding-posts, $q'\ q^2\ q^3\ q^4$, which are respectively connected with the contact-plates $t'\ t^2\ t^3\ t^4$, of a double switch, $S^3$, of familiar construction, having two separately-pivoted arms, $r\ r'$, connected by a bar, $r^2$, of non-conducting material, so that they may for convenience be simultaneously swung from one pair of contact-plates to another. Below the double switch $S^3$ is a spring-jack, J, the construction of which will be clearly understood by reference to Fig. 2. A metallic strip-spring, $j$, has one end secured to a metal pin or post, $j^2$, projecting from the board, and is bent around the post under tension, so that its extended portion will press strongly upon a metallic base, $j^4$, secured to the board, and having connected to it a binding-post, $j^5$. The post $j^2$ has a binding-screw and wire-hole in its outer end.

We will now suppose that in the various consumers' circuits are used a kind of incandescing electric lamp requiring the electromotive force of seventeen secondary battery-cells. Circuit No. 1 includes twelve of such lamps connected in parallel or multiple arc, as shown at L. One switch-board terminal of this circuit is connected with the base $j^4$ of the spring-jack J, as shown by the wire $w'$, and the other terminal is connected by the wire $w^2$ to arm $r'$ of the double switch $S^3$, while the other arm, $r$, of said switch is connected with the spring $j$ of the spring-jack by a wire, $w^3$. To circuit No. 1 are allotted sections No. 1 and No. 2, and two supernumerary cells (marked S$u$) of the series A of secondary-battery cells. Sections No. 1 and No. 2 each compose seventeen cells. From one terminal cell of section No. 1 a wire, $w^4$, leads to binding-post $p'$ on the switch-board, and from this post a wire, $w^5$, leads to post $q'$ on contact-plate $t'$. From the other terminal cell of section No. 1 a wire, $w^6$, leads to post $p^2$ on contact-plate $c'$. From one terminal cell of section No. 2 a wire, $w^7$, leads to binding-post $p^4$, and from this post a wire, $w^8$, leads to post $q^2$ on contact-plate $t^2$, while from the other terminal of the section a wire, $w^9$, leads to post $p^5$ on contact-plate $c^3$. From the second cell from the left-hand end of section No. 2 a wire, $w^{10}$, leads to binding-post $p^3$ on contact-plate $c^2$, and from the right-hand one of the two supernumerary cells S$u$ a wire, $w^{11}$, leads to post $p^6$ on contact-plate $c^4$. The single switch S' is, by a wire, $w^{12}$, connected with post $q^3$ on contact-plate $t^3$ of the double switch, and single switch $S^2$ is, by a wire, $w^{13}$, connected with a post, $q^4$, on contact-plate $t^4$ of said double switch.

I will now explain the manner of using the switches. At the appointed time for lighting the lamps in circuit No. 1 the double switch $S^3$ has its arms placed, respectively, in contact with its contact-plates $t'$ and $t^3$, as shown in the group of devices arranged for connection with the circuit No. 1, and the single switch S' is placed on its contact-plate $c'$. It will now be seen that section No. 1 of battery-cells is connected operatively with consumer's circuit No. 1, the completed circuit leading from one terminal of the battery-circuit over wire $w^4$, post $p'$, wire $w^5$, post $q'$, contact-plate $t'$, switch-arm $r$, wire $w^3$, spring-jack J, wire $w'$, through lamps L, and thence over wire $w^2$, switch-arm $r'$, contact-plate $t^3$, post $q^3$, wire $w^{12}$, switch S', contact-plate $c'$, post $p^2$, and wire $w^6$ back to the battery-section No. 1. During the time this section No. 1 of cells is in use on circuit No. 1 tests are made at intervals to ascertain if a current of proper potential is being put upon the circuit by the said section, and all other circuits are similarly tested when in use. These tests are made by means of an ammeter, one or more of such instruments being included in the equipment of every battery-station.

The letter M indicates, conventionally, an ammeter the construction of which need not be particularly described, as it is a well-known instrument. To the terminal posts $m\ m$ of the ammeter are connected the wires of a connecting-cord, K, these wires being at their other ends connected to the opposite metal plates, $e\ e$, of a connecting-wedge, E, said plates being fixed upon opposite sides of an intervening non-conducting plate, $e'$, provided with a suitable handle. It will be readily understood that if this wedge be inserted between the spring $j$ and base $j^4$ of one of the spring-jacks, as shown in Fig. 3, the ammeter will be included in the circuit of which the spring-jack forms a part, and the strength of current on such circuit may be ascertained. If, on testing, it be found that the strength of current on circuit No. 1 has somewhat fallen off after the connected battery-section has been in use for a less number of hours than it should usually act efficiently, the current may be reenforced by moving switch S' to contact-plate $c^2$, thus adding two cells of section No. 2 to section No. 1 in series, as it will be seen that this contact-plate $c^2$ is connected by wire $w^{10}$ with the second cell of section No. 2 from the left. When, now, the usual number of hours for section No. 1 to act have expired, or when a test shows that even after being re-enforced section No. 1 is not putting a current of proper strength upon its connected circuit, the double switch $S^3$ should be shifted so that its arms will come in contact with contact-plates $t^2$ and $t^4$, the single switch $S^2$ being put upon its contact-plate $c^3$. Thus section No. 1 will be cut off and the entire section No. 2 placed on circuit No. 1, the two cells of said section which have been used to re-enforce section No. 1 being still fit for use with their own section, if they have not been used too long. A test will show whether or not section No. 2 is putting out a proper current, and if not, it may be re-enforced by moving single switch $S^2$ to its contact-plate $c^4$, which will add the two supernumerary cells $Su$ to section No. 2, as will be seen.

The equipments of all the circuits being the same, the manipulation of the apparatus for all circuits having their battery-sections in the same series will be understood from the foregoing explanation. There may, however, be occasions when the cells which in a certain series are allotted to a particular consumer's circuit will be all exhausted, while the lamps in the said circuit are still required to be lighted. In such a case any section which is not otherwise in use may be connected to the said circuit by connecting, as indicated by dotted lines $w^{14}\ w^{15}$, from a pair of the double-switch contact-plates of the borrowing circuit to the wires leading from opposite ends of the section to be borrowed, first throwing the single switches of the borrowing circuit off of their contact-plates. Again, there may occasion arise when, there being a large number of lamps in a circuit to be supplied, it may be desirable to borrow battery-sections in parallel for this circuit when those immediately adjacent to its own cells are not available for serial connection therewith. In such case it is not practicable to borrow a distant section in the same series, as intervening sections would be thus short-circuited, it being understood that the whole number of cells in a main series are always connected serially. For instance, if sections No. 1 and No. 6 were connected in parallel to circuit No. 3, it will be seen that this would be, in effect, connecting all intervening sections to circuit No. 3 also. It is therefore necessary to borrow from a different main series when a section is wanted for connection in parallel, and it is to provide conveniently for this emergency that the cells at a station are divided into two main series.

Let us now suppose that it is desired to connect an additional section of battery in parallel to circuit No. 3, which includes a large number of lamps, and that in main series A' of cells section No. 9 is employed on a circuit having a small number of lamps, and has energy to spare. Now this section No. 9, while still in use upon its own circuit, may be also connected in parallel to circuit No. 3 by connecting the double switch-arms $r\ r$ of the two circuits by a wire, $w^{16}$, and the arms $r'\ r'$ by a wire, $w^{17}$, as shown. Section No. 9 may be thus used to prolong the lighting of lamps on circuit No. 3 without depreciating the light of the lamps in its own circuit, No. 5, as it will be understood that any number of lamps in multiple arc requires the same number of battery-cells in series as any other number of lamps, and no more than a single lamp.

I have only shown a portion of the main series A' of secondary cells; but it will be understood that this series may comprise as many cells as the other main series, A. I have also shown only enough groups of switch-board devices to illustrate the usual modes of using the same. The number of such groups will in practice be such as required by the number of consumers' circuits centering at a station, and the groups used for both main series of cells may be on a single switch-board, or on two boards, if found more convenient. The number of consumers' circuits centering at a station is limited only by considerations of convenience. Each series of secondary cells at a station may be charged alone by connecting opposite ends of the series with a dynamo-electric machine in the well-known manner, or the two main series or any number of main series may be connected serially in a charging-circuit.

In the diagram Fig. 1, the wires $w^{20}\ w^{21}$ of a charging-circuit leading from a dynamo-electric machine, D, are connected to two binding-posts, $y\ y$, on the switch-board through a spring-jack, J, and these posts are connected, respectively, by wires $w^{22}\ w^{23}$, with the opposite ends of series A of secondary cells. Another dynamo, D', is shown similarly connected by wires $w^{24}\ w^{25}$ with posts $y'\ y'$, which are connected with opposite ends of series A' by wires $w^{26}\ w^{27}$. A single dynamo of sufficient power might be used to charge both series, either in multiple arc or serially.

Any suitable or known mode of connecting the cells to a dynamo or dynamos for charging may be practiced, and the dynamo or dynamos may be located wherever convenient, either at the station or at a distant place.

In addition to the equipment of a station, as heretofore described, I provide each station with a volt-meter, whereby the potential of currents delivered by the sections may be ascertained, and by which may also be tested the potential of the currents delivered by the dynamos in charging.

A volt-meter is designated by the letter V. It may be of any suitable or known construction, and the wires $v\ v$ leading therefrom are provided with terminal hook by means of which they may be hooked upon any pair of binding-posts for testing in the usual manner. If, on testing with the volt-meter, the potential of the current on any circuit be found deficient or excessive, it can be re-enforced by the means already described, or reduced by cutting off cells in a well-known manner. The charging process may proceed even while a number of sections are connected for use on their circuits and are discharging, as such discharging cells will act as conductors, and their discharge will not be interrupted by the charging-current passing through them from one section to another connected on opposite sides; but a small portion of the charging-current will by derivation flow over the consumers' circuits which may be in use while the charging is going on.

In Fig. 1 I have shown the series of cells at a station connected directly to the dynamo; but it may be convenient to have several stations in a system, and in such case the several stations may be connected in series to a dynomo, as indicated in Fig. 4.

The construction and arrangements of devices, as shown in the drawings and now described, are such as shown by experience to be sufficient for the ordinary requirements of the system in making connections, providing the required currents to the several consumers, and interchanging the cells among various circuits in order that the whole may be utilized to the best advantage.

Having now described my invention and the best mode and devices for using the same, I wish it to be understood that I do not confine myself to the constructions and arrangements shown in my drawings, but may vary the same in any manner for the better carrying out of my improvement without departing from the essential principle thereof.

What I claim is—

1. The combination, with a number of consumers' electric-lighting circuits centering at a common station, and a suitable number of secondary or accumulating electric-battery cells located at said station, of means for charging said cells at the station and for connecting the same in sections of suitable numbers of cells to the respective consumers' circuits, substantially as described.

2. The combination, with a number of consumers' electric-lighting circuits centering at a common station, and a suitable number of secondary or accumulating electric-battery cells located at said station, of means for connecting said cells in sections of suitable numbers to the respective consumers' circuits, and switching devices arranged for adding additional cells to normal sections or cutting off cells from a series of cells connected to particular circuits, substantially as described.

3. The combination, with a number of consumers' electric-lighting circuits centering at a common station, and a suitable number of secondary or accumulating electric-battery cells located at said station, of means for connecting said cells in sections of suitable numbers to the respective consumers' circuits, and switching devices for interchanging sections of cells upon circuits, substantially as described.

4. The combination, with any number of consumers' electric-lighting circuits centering at a common station, and a suitable number of secondary or accumulating electric-battery cells located at said station, of means for connecting said cells in sections of suitable numbers of cells to different consumers' circuits, and switching devices for disconnecting sections from circuits and connecting other sections in lieu of said disconnected sections, substantially as described.

5. The combination, with a number of consumers' electric-lighting circuits centering at a common station, and a suitable number of secondary or accumulating electric-battery cells divided into a plurality of series, of means for connecting sections of cells from different series in parallel or multiple arc to any consumer's circuit, substantially as described.

In testimony that I claim the foregoing as my own I hereunto affix my signature in presence of two witnesses.

ALEXANDER H. BAUER.

Witnesses:
A. G. DAVIS,
J. R. JOHNSON.